Feb. 2, 1937.  D. J. BAKER  2,069,471
ANTIFRICTION SCREW
Filed June 19, 1936  2 Sheets-Sheet 1
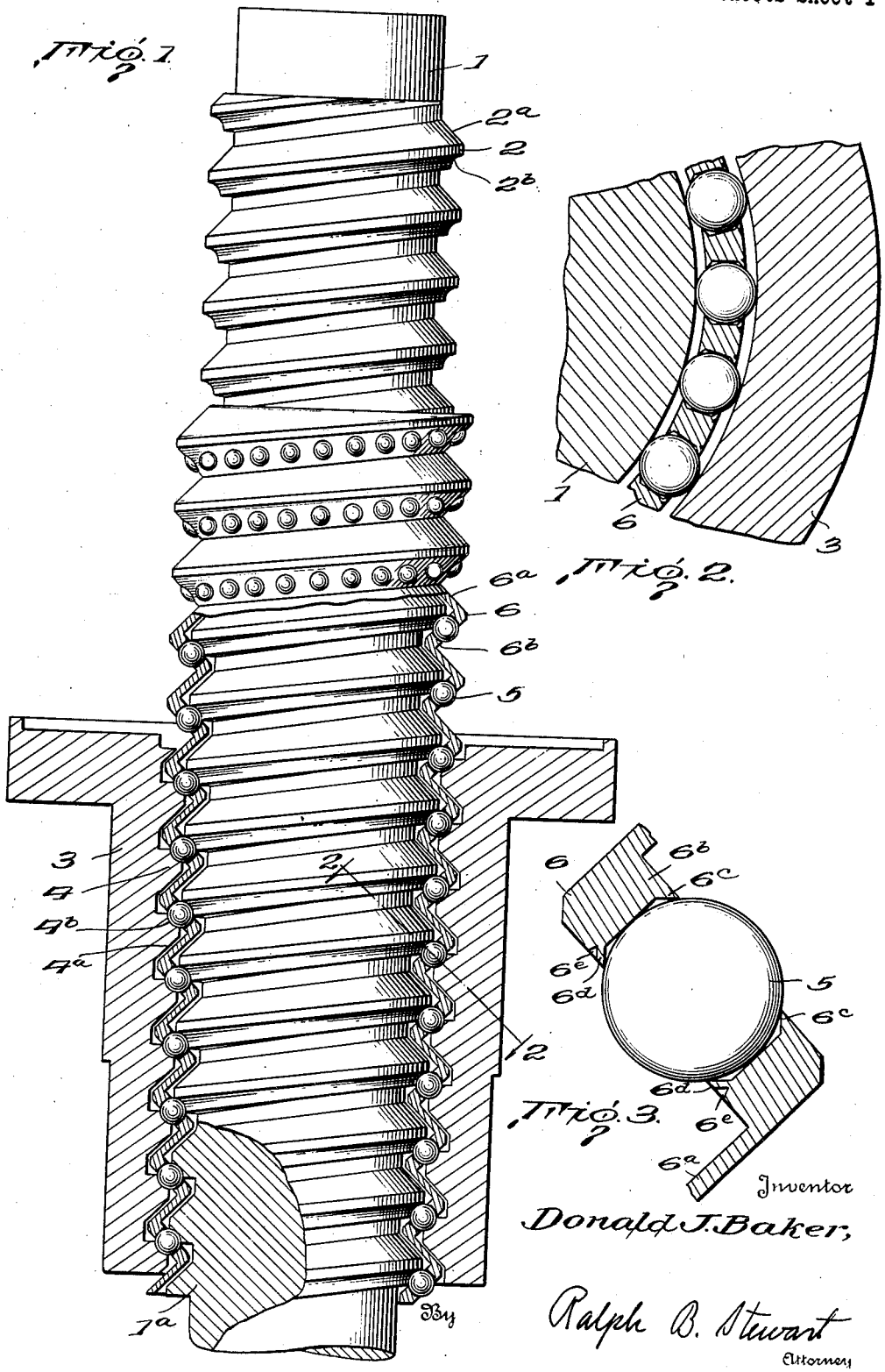
Inventor
Donald J. Baker,
By
Ralph B. Stewart
Attorney

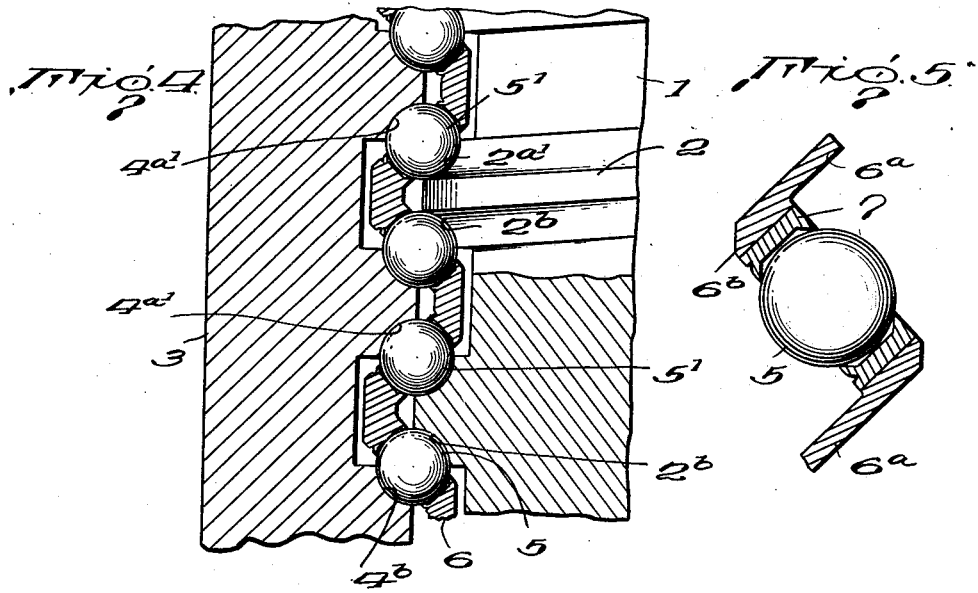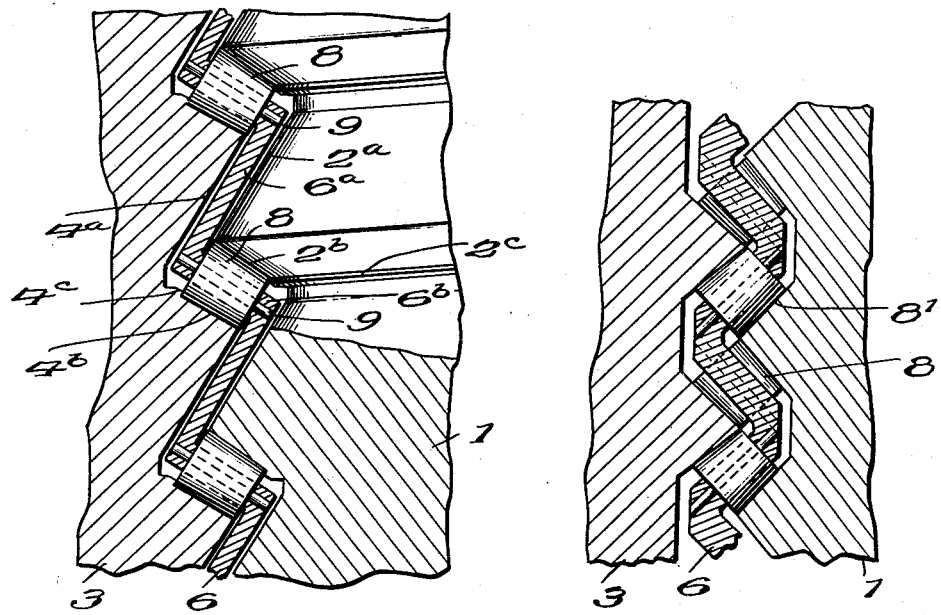

Patented Feb. 2, 1937

2,069,471

UNITED STATES PATENT OFFICE 2,069,471

ANTIFRICTION SCREW

Donald J. Baker, Pasadena, Calif.

Application June 19, 1936, Serial No. 86,188

10 Claims. (Cl. 74—459)

This invention relates to a screw and nut assembly and in particular to constructions employing ball and/or roller bearings for reducing the friction between a screw and a cooperating nut.

A general object of the invention is to devise an improved construction of ball-bearing or roller-bearing screws for carrying greater loads. A specific object of the invention is to devise an improved retainer or cage for the anti-friction bearings which takes up very little space between the screw and the nut. A further object is to devise an improved thread construction in the nut and screw assembly which will permit the ball or roller races on both the screw and the nut to be formed by grinding operations.

The constructions of my invention are capable of general use in any situation where screws are useful, such as in lifting jacks, pumps, presses and the like.

My invention is illustrated in the drawings in which:

Figure 1 is a view showing one arrangement of ball-bearing screw and nut assembly in side elevation with parts of the assembly shown in section;

Figure 2 is an enlarged fragmentary sectional view taken along line 2—2 of Figure 1;

Figure 3 is an enlarged detailed view showing the manner of mounting a ball in the ball retainer;

Figure 4 is a fragmentary view, partly in section and partly in elevation, showing another arrangement of ball bearing screw and nut assembly in which ball races are provided on both sides of the screw thread;

Figure 5 is a fragmentary enlarged sectional view showing a modified method of mounting the balls in the retainer;

Figure 6 is a fragmentary view, partly in section and partly in elevation, illustrating a nut and screw assembly employing roller bearings; and Figure 7 is a fragmentary vertical sectional view showing a modified arrangement of roller bearings on each side of the threads of the nut and screw.

Referring to Figure 1 the screw 1 is provided with a helical thread 2 formed thereon, the upper side 2a of the thread being preferably formed at an angle of 45 degrees to the axis of the shaft, and the lower face of the thread having a ball race 2b formed thereon, the race being preferably formed as one quarter of the arc of the circle and being transversely inclined at an angle of 45 degrees to the axis of the screw. The axial contour of the thread on the screw is shown at the bottom of the screw in the cross-hatched area marker 1a. The nut which cooperates with the screw is indicated at 3 in section and is provided with a helical thread 4 of the same pitch as the screw thread 2, and this thread is preferably formed with a lower side 4a arranged at 45 degrees to the axis of the thread or parallel with the upper face 2a of the screw thread 2, and a ball race 4b is formed along the upper edge of the thread 4. The ball race 4b is also preferably formed as the arc of a quarter-circle and is transversely inclined to the axis of the nut by an angle of 45 degrees.

The screw 1 is supported within the nut 3 by means of a series of balls 5 which are arranged about the screw and are seated in the ball-race 4b formed on the thread of the nut and engage the ball-race 2b formed on the thread of the screw. The balls 5 are maintained in proper spaced relation by a retainer or cage 6 which is preferably formed as a shell-like member having a threaded exterior and a threaded interior of the same pitch as the nut and screw threads and having a shape closely conforming with the threads on the nut and the screw. As will be seen from Figure 1, the upper end of the retainer comprising the three upper convolutions of the thread is shown in elevation, while the lower portion is shown in section. The retainer is preferably formed of two helical walls 6a and 6b arranged at right angles to each other and each being transversely inclined at an angle of 45 degrees to the axis of the screw. The wall 6b is of sufficient thickness to serve as a carrier for the balls 5, while the walls 6a may be reduced in section to a thickness sufficient only to give the required strength or rigidity to the retainer. The retainer 6 may be formed by die-casting, or it may be formed from solid or tubular stock by machining the thread-like outer and inner surfaces on a lathe, or, if desired, the retainer may be formed by two separate helical strips, one forming the wall 6a and the other forming the wall 6b, and the two being suitably joined together as by welding along the edges. If desired, the retainer may be formed of a single helical strip formed in the shape of wall 6b, and for the purpose of re-enforcing the retainer, jumper strips may be secured across adjacent edges of adjacent convolutions of the strip.

One method of mounting the balls in the retainer 6 is illustrated in Figure 3. First, the holes for receiving the balls are formed by drilling through the thick wall 6b from the outside of the retainer, and the drilling operation is stopped before the drill passes entirely through the wall so as to leave a tapered shoulder 6c at the bottom of the hole. The drill is large enough to afford adequate clearance for the ball 5, and the shoulder 6c prevents the ball from passing through the hole. After the balls are placed in the holes of the retainer, a retaining shoulder 6d similar to shoulder 6c is formed around the edge of the hole at the other face of the wall 6b in any desired manner, as by a suitable swaging tool. The indentation formed by the swaging tool is shown at 6e in Figure 3. Any other suitable method of retaining the balls in the holes may be employed.

The enlarged sectional view shown in Figure 2 illustrates the arrangement of the balls in the retainer along the axis of the thread. The balls may be spaced apart any desired distance consistent with the load to be carried. It will be understood that the closer the spacing the greater the allowable load which can be carried by the screw, and the only limit to the closeness of spacing is the reduction of the material of the retainer between the balls to a point to weaken the retainer.

As will be understood by those skilled in the art, the nut may be held stationary and the screw rotated, or vice versa. In any case, the retainer 6 is free to rotate, and will rotate at half the speed of the rotary element and will advance at half the axial speed as the movable element. Accordingly, in designing a screw according to my invention, in order that the race on the nut thread shall be completely filled with balls or rollers at all times, the retainer should have a length equal to one-half of the distance of travel of the movable element plus the length of the nut.

In Figure 4, I have shown a modified construction similar to that illustrated in Figure 1, and corresponding elements in these two figures are indicated by the same reference numerals. In this arrangement ball race 2a' is formed on the upper surface of the screw thread 2 while the opposing ball race 4a' is formed on the lower face of the nut thread 4, and a series of balls 5' are arranged between these two races. This construction also includes the ball races 2b and 4b, with balls 5, the same as in Figure 1. With this arrangement, the nut and screw assembly will withstand a thrust in either direction along its axis, whereas in the arrangement of Figure 1, axial thrust can be applied in one direction only. The construction of the retainer 6 in Figure 4 is substantially like that shown in Figure 1 in that it is formed mainly of two helical walls arranged at right angles to each other, but ball bearings are supported in each helical wall instead of in only one wall.

In Figure 5 I have illustrated a modified arrangement for mounting the ball bearings in the retainer. In this arrangement I have shown the ball 5 as being mounted in a separate metallic insert 7 which in turn is supported in any suitable manner in holes formed in the retainer wall 6b. By employing a separate metallic retainer for each individual ball, it is possible to first mount the ball within the retainer 7 separate from the cage retainer 6, and then mount the unit assembly, including the ball 5 and the retainer 7, within the cage retainer 6.

In Figure 6 I have illustrated a nut and screw assembly similar to that shown in Figure 1 but in which roller bearings are substituted for ball bearings. In this arrangement the races 2b and 4b are formed with straight transverse sections arranged at an angle of substantially 60 degrees to the axis of the screw, and the two thread faces 2a and 4a have substantially straight transverse sections arranged substantially at right angles to the faces 2b and 4b. The retainer 6 is also formed of two helical walls 6a and 6b arranged at right angles to each other transversely. A series of rollers 8 are mounted in apertures formed in helical wall 6b and may be retained in these apertures in any suitable manner as by pins 9 supported in the wall 6b and freely passing through the rollers 8. The rollers 8 may be cylindrical in shape, but in order to obtain better rolling action I prefer to form them in a frusto-conical shape, with the apex of the generating cone located substantially on the axis of the screw.

In order to provide a lateral bearing surface and prevent lateral shifting of the screw, a shoulder 2c may be formed on the inner edge of the race 2b and a similar shoulder 4c may be formed on the inner edge of the race 4b and these two shoulders cooperate with the opposing ends of the rollers 8 to prevent excessive lateral play between the screw and the nut.

In Figure 7 I have illustrated a fourth modification of a nut and screw assembly, and this arrangement corresponds to the arrangement shown in Figure 4 except that roller bearings are employed instead of ball bearings. As will be seen from the drawings, the bearing retainer element also consists mainly of two helical walls having transverse inclinations of substantially 45 degrees to the axis of the screw and being arranged at right angles to each other. A series of rollers 8 are located between two opposing faces of the threads of the nut and screw while a series of rollers 8' are arranged between the two remaining opposing faces of the threads on the nut and screw. As shown in Figure 7, I prefer to stagger the rollers 8 and 8' in vertical spacing for convenience in mounting the rollers within the retainer 6. Here also, the rollers are formed with the frusto-conical shape with the apex of the generating cone located substantially on the axis of the screw.

From what has been said above, it will be clear that due to the particular construction and arrangement of the retainer, the retainer takes up very little space between the screw and the nut, and it is, therefore, possible to employ a screw having threads with an outside diameter equal to or greater than the inside diameter of the thread in the nut. This construction offers a greater seating area for the balls and/or rollers and, therefore, a correspondingly greater load carrying capacity of the screw. Also, the particular shape and arrangement of the two ball or roller races provides lateral support for the screw and prevents wobbling of the screw. Furthermore, by forming the two races at an angle in the manner described, it is possible to grind these races to accurate shape, and this would not be possible in case the races were formed in the side of a thread of square cross-section. It will be understood that the races may be ground to shape by means of a grinding wheel of a smaller diameter than the inside diameter of the thread on the nut and operated on a spindle extending into the nut substantially parallel with the axis of the nut.

It will be noted that in all forms of my invention disclosed herein, the thread face extends below the lower edge of the bearing race on the root side of the thread, that is, the bearing race is spaced from the root of the thread. This construction permits the ball retainer to be formed of helical walls of straight transverse sections arranged at substantially right angles to each other, and it provides sufficient room for the helical walls of the retainer to extend beyond the ball races and to give adequate support for the balls as shown in the various figures of the drawings.

In the appended claims the terms "rolling bearing elements" and "anti-friction elements" are to be interpreted broadly to apply to either a ball element or a roller element; the term "bearing race" is to be broadly interpreted to apply to a race for either a ball or a roller; the term "complemental" is used to define the relation between the exterior and interior thead on the retainer whereby the retainer is formed as two helical walls having transverse angular relations corresponding to the angular relations of the faces of the thread.

While I prefer to use a 45 degree relation of the two helical walls forming the cylindrical bearing retainer in Figures 1, 4, and 7, which results in the two walls being at right angles to each other, it will be understood that this relation is not absolute but may be varied somewhat above or below this angle. Also, the axis of the rollers 8 in Figure 6 may vary from the 60 degree angular position with respect to the axis of the screw.

What I claim is:

1. In combination, a screw and a cooperating nut, each provided with V-shaped threads, a bearing race formed on one face of the thread of said screw and spaced from the root thereof, a bearing race formed on an opposing face of the thread of said nut and spaced from the root of the thread, a plurality of rolling bearing elements arranged in said races, and a retainer located between said screw and nut for maintaining said bearing elements in spaced relation, said retainer comprising a tubular member formed of two helical walls arranged substantially at right angles to each other transversely thereof, one helical wall being arranged between one pair of opposing faces of the threads on the nut and screw and the other helical wall being arranged between the other pair of opposing faces of the threads on the nut and screw, said rolling bearing elements being retained in holes formed in one of said helical walls.

2. In combination, a screw and a cooperating nut, each provided with V-shaped threads, the faces of each of said threads being arranged substantially at 90 degrees to each other, a bearing race formed on one face of the thread of said screw and spaced from the root thereof, a bearing race formed on an opposing face of the thread of said nut and spaced from the root of the thread, a plurality of rolling bearing elements arranged in said races, and a retainer located between said screw and nut for maintaining said bearing elements in spaced relation, said retainer comprising a tubular member having a V-shaped thread formed on the exterior thereof and a similar thread formed on the interior in complemental relation with the exterior thread, whereby said retainer is formed of two helical walls joined along their edges, one helical wall being located between one pair of opposing faces of the threads on the screw and nut while the other helical wall is arranged substantially at right angles to the first helical wall and is located between the other pair of opposing faces of the threads on said screw and nut.

3. A screw comprising a spindle having a V-shaped thread formed thereon with the faces thereof arranged substantially at 90 degrees to each other, and a bearing race formed on one face of said thread, said race being arranged so that its lower edge is spaced from the root of said thread.

4. A nut comprising a hollow member having a V-shaped thread formed within the bore thereof, the faces of said thread being arranged substantially at 90 degrees to each other, and a bearing race formed on one face of said thread, said race being arranged so that its lower edge is spaced from the root of said thread.

5. In combination, a screw and a cooperating nut, each provided with V-shaped threads, and a plurality of roller bearing elements arranged between opposing faces of the threads on said nut and having their axes directed substantially towards the axis of said screw, said opposing thread faces being provided each with a shoulder cooperating with opposing ends of said rollers to prevent lateral displacement of said screw with respect to the nut.

6. A retainer for rolling bearing elements comprising a tubular member formed of a helical wall of uniform thickness and having a transverse inclination of substantially 45 degrees to the axis of the cylinder and a second helical wall of uniform thickness joining adjacent edges of the first helical wall and having a transverse inclination of substantially 90 degrees to the first helical wall, one of said helical walls being thicker than the other and being provided with a plurality of spaced holes for receiving and retaining a plurality of rolling bearing elements.

7. A ball retainer comprising a tubular member having a V-shaped threaded exterior and a threaded interior complemental to the exterior, the walls of said thread being arranged substantially at right angles to each other and a plurality of balls supported in a plurality of holes formed in one side-wall of said thread, each of said balls being mounted in an individual retainer ring which in turn is supported in a hole formed in said hollow cylinder.

8. A retainer for rolling bearing elements comprising a tubular member formed of two helical walls joined along their edges and being arranged substantially at right angles to each other transversely of their length, one of said helical walls being provided with a plurality of holes spaced along the length thereof, a rolling bearing element arranged in each hole, and means for retaining said elements in said holes independently of said screw and nut.

9. In combination, a screw and a cooperating nut, each provided with V-shaped threads, the walls of said threads being arranged substantially at right angles to each other, a plurality of rolling bearing elements arranged between opposing faces of the threads of said nut and screw, a retainer located between said screw and said nut for maintaining said bearing elements in spaced relation, said bearing elements comprising rollers mounted in individual holes formed in said retainer, and means for mounting said rollers in said holes with their axes directed towards the axis of said screw.

10. In combination, a screw and a cooperating nut, each provided with V-shaped threads, the walls of said threads being arranged substantially at right angles to each other, a plurality of rolling bearing elements arranged between opposing faces of the threads on said nut and screw, said bearing elements comprising frusto-conical rollers having the apex of the generating cone located substantially on the axis of the screw, and a retainer located between said screw and nut for maintaining said rollers in spaced relation, each of said rollers being rotatably mounted upon a bearing pin passing through the center thereof and secured to said retainer.

DONALD J. BAKER.